(12) United States Patent
Sasnowitz

(10) Patent No.: US 6,993,768 B2
(45) Date of Patent: Jan. 31, 2006

(54) METHOD OF STORING MULTI-PARAMETER CONFIGURATION INFORMATION

(75) Inventor: Harold Sasnowitz, Binghamton, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 764 days.

(21) Appl. No.: 09/955,331

(22) Filed: Sep. 19, 2001

(65) Prior Publication Data
US 2003/0055751 A1    Mar. 20, 2003

(51) Int. Cl.
G06F 17/22 (2006.01)
G06F 7/00 (2006.01)

(52) U.S. Cl. ............... 719/310; 707/2; 708/542

(58) Field of Classification Search ......... 707/1–10, 707/100–104.1, 200–206; 705/14; 708/408, 708/519, 542, 673; 719/310–332
See application file for complete search history.

(56) References Cited

U.S. PATENT DOCUMENTS

| | | | |
|---|---|---|---|
| 4,360,914 A * | 11/1982 | Brock-Nannestad | 714/701 |
| 4,381,554 A * | 4/1983 | Reach et al. | 708/139 |
| 5,560,007 A | 9/1996 | Thai | |
| 5,689,247 A * | 11/1997 | Welner | 340/5.51 |
| 5,761,652 A | 6/1998 | Wu et al. | |
| 5,813,001 A | 9/1998 | Bennett | |
| 5,829,004 A | 10/1998 | Au | |
| 5,852,821 A | 12/1998 | Chen et al. | |
| 5,987,457 A | 11/1999 | Ballard | |
| 6,064,999 A | 5/2000 | Dalal | |
| 6,067,540 A | 5/2000 | Ozbutun et al. | |
| 6,081,804 A | 6/2000 | Smith | |
| 6,253,188 B1 * | 6/2001 | Witek et al. | 705/14 |
| 6,725,223 B2 * | 4/2004 | Abdo et al. | 707/100 |
| 6,725,235 B1 * | 4/2004 | Dyer et al. | 707/104.1 |
| 2002/0169977 A1 * | 11/2002 | Chmaytelli | 713/200 |
| 2003/0172051 A1 * | 9/2003 | Ouchi | 707/1 |

* cited by examiner

Primary Examiner—Lewis A. Bullock, Jr.
(74) Attorney, Agent, or Firm—Whitham, Curtis & Christofferson, P.C.

(57) ABSTRACT

A system and method define a multi-parameter configuration using an identifier. The identifier involves assigning values to available options for parameters of a configuration and using the assigned values to construct an identifier representing the configuration. The constructed identifier may then be used for identification purposes, stored in a field in a database or as an entry in a list or an array, easily searched and easily sorted.

21 Claims, 6 Drawing Sheets

1. Division⊂{1.Pontiac, 2.Chevrolet, 3.Buick, 4.Cadillac 5.Oldsmobile, 6.GMC, ...}

2. Model⊂{1.Bonneville, ...; 1.Corvette,...; 1.Century, 2.Regal, 3.LeSabre, 4.ParkAvenue .. 1.Seville,...; 1.Cutlass Supreme,...; ...}

3. Paint⊂{1.Red, 2.Orange, 3.Yellow, 4.Green, 5.Blue, 6.Violet}

4. Radio⊂{1.None, 2.AM, 3.AM/FM, 4.AM/FM Stereo, 5.AM/FM Stereo Tape, 6.AM/FM Stereo CD}

5. Transmission⊂{1.L6, 2.L8, 3.T12, 4.T14}

6. Tires⊂{1.Black Wall, 2.White Wall, 3.Performance}

7. Antenna⊂{1.Windshield, 2.Fixed, 3.Manual Telescope, 4.Electric Telescope}

8. Interior Color⊂{1.Red, 2.Blue, 3.Grey, 4.Black, 5.Cream}

9. Front Seat⊂{1.Solid, 2.Split, 3.Bucket}

10. Windshield⊂{1.Plain, 2.Tinted}

Figure 4

| Configuration | Location | Quantity |
|---|---|---|
| 1,111,111,111 | Pontiac, MI | 3 |
| 1,111,111,112 | Pontiac, MI | 2 |
| 1,111,111,113 | Enroute CLE | 4 |
| 1,111,111,114 | | 0 |
| ... | | |
| 3,166,432,532 | Tonowanda, NY | 2 |
| ... | | |
| A,666,434,532 | Dearborn, MI | 8 |

Figure 6

METHOD OF STORING MULTI-PARAMETER CONFIGURATION INFORMATION

FIELD OF THE INVENTION

This invention relates to the field of computerized information storage, searching and retrieval. More particularly, this invention relates to a method of facilitating storage, searching and retrieval of multi-parameter configuration information.

BACKGROUND

Many processes, such as computer-implemented manufacturing processes, require the management of multi-parameter configuration information. For example, "Build-to-Stock" manufacturing systems assemble large quantities of identical products to meet forecasted demand. The assembly line is tooled for the desired product. Assembled products are then warehoused until a demand occurs. While such systems offer economies of scale based upon the assembly of large quantities of identical units without retooling, successful implementation requires careful inventory management. At any given time the quantity and location of assembled products having specified attributes must be ascertainable to forecast demand, regulate assembly operations and match inventory with orders.

Computers and automobiles are examples of products assembled in build-to stock manufacturing environments. They are multiparameter items, as they are generally identifiable by various product features (i.e., parameters). For example, an automobile may be identified by its make, model, color, etc. Likewise, a personal computer may be identified by its model, CPU, RAM, etc. Furthermore, they are configurable items, as each parameter may be varied within a limited range of possible values for a particular manufacturing system.

Manufacturing and inventory management systems typically store and track information pertaining to products. The information may include a plurality of records, each having a number of different fields. In the case of an automobile manufacturing system, for example, the fields may include make, model, color, etc. Locating a record or group of records using predetermined search criteria, such as a particular make, model and color of an automobile, can be accomplished by sequentially searching each record and comparing the data in the make, model and color fields with the desired make, model and color. In such a case, a separate comparison may be required for each searched field of a record, until a non-matching entry is detected. Of course, the time required for such a search depends, in part, upon the number of records in the database, as well as the number of fields searched.

Searching is often one of the most time-consuming operations of an application, and substituting a good search method for an inefficient one may substantially improve performance. While techniques known in the art, such as sorting, binary tree and hashing techniques, can reduce searching time, they are often cumbersome to implement and do not restructure records to facilitate searching. Instead, such techniques are generally designed to work irrespective of the number of fields per record, even where each field has an unlimited number of possible entries. Consequently, techniques known in the art fail to leverage characteristics of records that may facilitate searching.

Thus, a system and method are needed to facilitate storage, searching and retrieval of information for multi-parameter configurations, while providing a unique identification for every possible configuration, allowing the addition of parameters, accommodating expansion of a range of options per parameter without requiring conversion of existing configuration information and being compatible with existing data storage, searching and retrieval techniques.

SUMMARY

It is therefore an object of the present invention to provide a system and method to facilitate storage, searching and retrieval of information for multi-parameter configurations.

It is another object of the invention to provide a system and method that provides unique identifications for multi-parameter configuration and facilitates storage, searching and retrieval of information for the multi-parameter configurations.

It is also another object of the invention to provide a system and method to facilitate storage, searching and retrieval of information for multi-parameter configurations while accommodating expansion of a range of options per parameter without requiring conversion of existing configuration information.

It is also another object of the invention to provide a system and method to facilitate storage, searching and retrieval of information for multi-parameter configurations while accommodating the addition of parameters.

It is yet another object of the invention to provide a system and method to facilitate storage, searching and retrieval of information for multi-parameter configurations using existing data storage, searching and retrieval techniques.

It is a further object of the invention to provide a system and method to facilitate storage, searching and retrieval of information for multi-parameter configurations by leveraging the characteristics of multi-parameter configurable items, with each parameter having a limited range of possible values.

It is also a further object of the invention to provide a system and method for efficiently defining a multi-parameter configuration of a product using a number.

It is yet a further object of the invention to provide a system and method for efficiently defining a multi-parameter configuration of a product using a number by assigning numerical values to available options for parameters of a product and using the assigned values to construct a number representing a configuration of the product.

To accomplish these and other objects of the present invention, a system and method are provided for efficiently defining a multi-parameter configuration using a identifier. The method involves assigning values to available options for parameters of a configuration and using the assigned values to construct an identifier representing the configuration. The constructed identifier may then be used for identification purposes, stored in a field in a database or as an entry in a list or an array, easily searched and easily sorted.

BRIEF DESCRIPTION OF THE DRAWINGS

The foregoing and other objects, features and advantages of the present invention will become better understood with reference to the following description, appended claims, and accompanying drawings, where:

FIG. 4 depicts parameters and corresponding options for automobile configurations, as an example of a multi-parameter configurable item, in accordance with a preferred implementation of the subject invention;

FIG. 6 depicts a conceptual embodiment of an exemplary table that includes configuration information, in accordance with the present invention, along with associated location and quantity information.

DETAILED DESCRIPTION

The present invention provides a system and method for efficiently defining a multi-parameter configuration of a product using an identifier. The method involves assigning values to available options for parameters of a configuration and using the assigned values to construct an identifier representing the configuration. The constructed number may then be used for identification purposes, stored in a field in a table, database or file, or as an entry in a list or an array, easily searched as a number and easily sorted.

Figure 1:
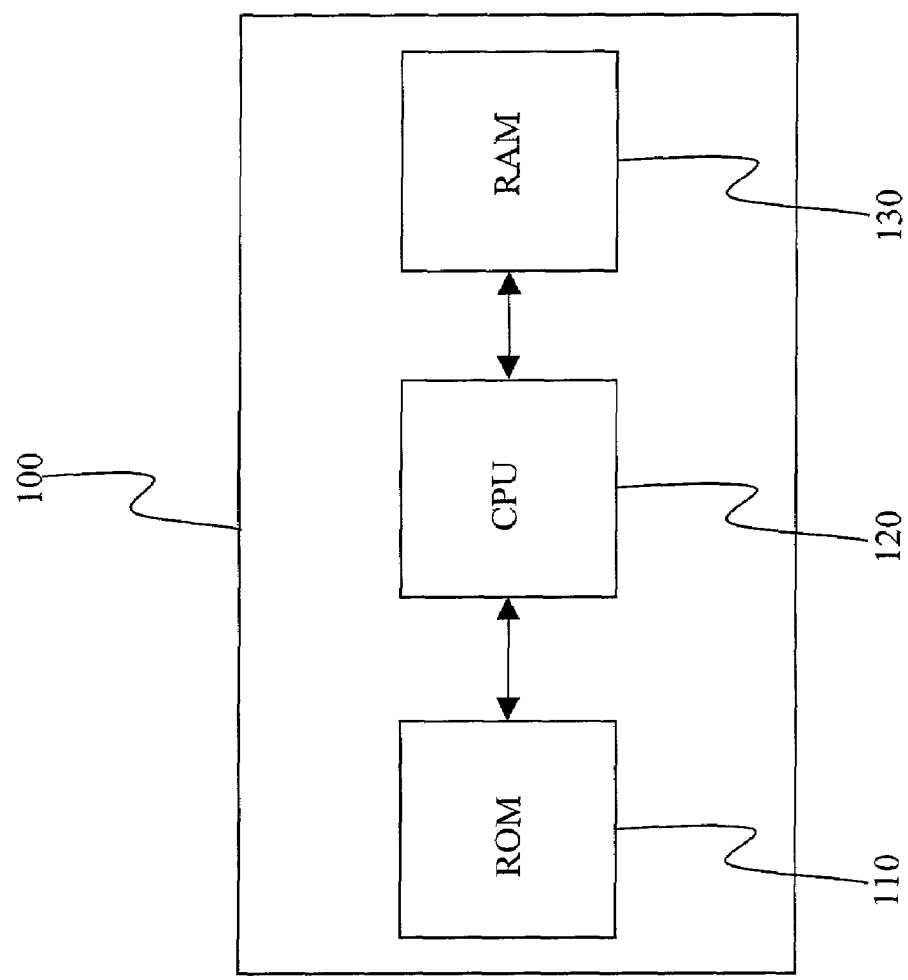
FIG. 1 is a conceptual diagram of a system for storing, searching and retrieving information in accordance with the present invention.

Referring to FIG. 1, a system 100 for storing, searching and retrieving information in accordance with the present invention preferably includes a central processing unit (CPU) 120, a read only memory (ROM) 110 and a random access memory (RAM) 130. These elements are typically found in most computers and the aforementioned system is intended to represent a broad category of information management devices. Of course, the system may include other elements, such as input/output circuits and devices and mass storage devices. Additionally, RAM or other storage means may be used in lieu of ROM, and vice versa. The system may either stand alone or operate in a distributed environment.

Figure 2:
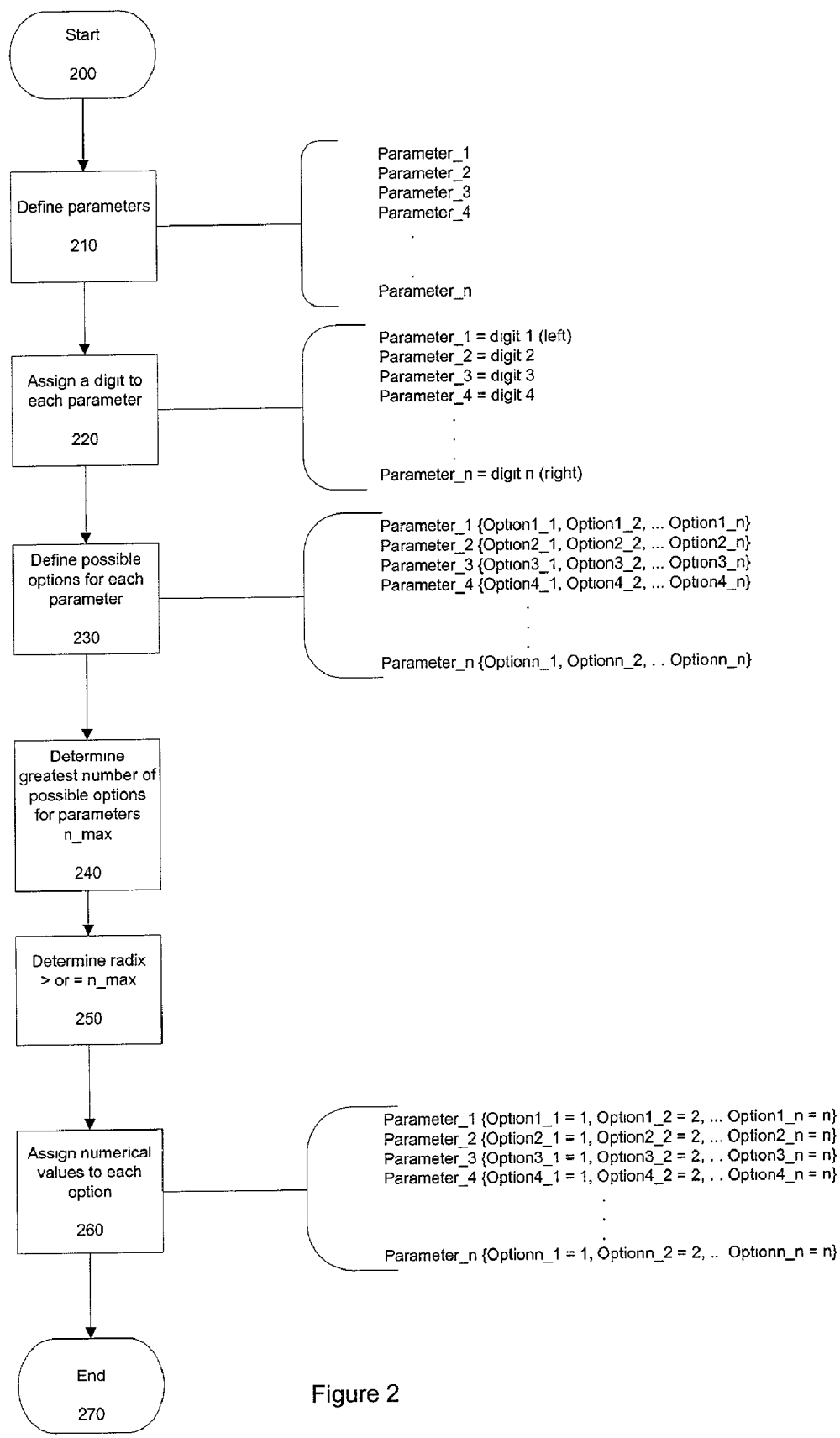
FIG. 2 depicts a flowchart illustrating an exemplary assignment process in accordance with the present invention.

Referring to FIG. 2, a flowchart illustrating an exemplary assignment process in accordance with the present invention is shown. First, parameters of the product are defined, as in step 210. The parameters are variable features having a determinable range of options. Preferably, the parameters include all variable features used to define a specific product configuration.

To illustrate, in the case of a personal computer system, parameters may include the model, CPU, RAM, hard drive, CD-ROM drive, monitor, operating system, modem, keyboard, pointing device, audio card, graphics card and speakers. If the information is being used by a personal computer manufacturer, the make of the computer (e.g., COMPAQ®) will probably not vary, and therefore need not be a parameter. However, if the information is being used by a personal computer retailer, the make of the computer may vary (e.g., COMPAQ®, HP®, IBM®), and therefore may be a parameter. (The marks COMPAQ®, HP® and IBM® are registered trademarks of Compaq Computer Corporation, Hewlett-Packard Company and International Business Machines Corporation, respectively.)

In the case of an automobile, parameters may include division (or make), model, paint, radio, transmission, tires, antenna, interior color, front seat, and windshield, as shown in FIG. 4. Of course, the foregoing parameters are identified to illustrate an implementation of the present invention. Other parameters may be used in lieu of, or in addition to, the foregoing parameters, with the ultimate goal being to adequately describe the product for the intended purpose of the description.

A multi-parameter configuration within the scope of the present invention may include process configurations, product-by-process configurations and product configurations. Though consumer products (e.g., personal computers and automobiles) are discussed herein as examples of possible subject matter having multi-parameter configurations, application of the present invention is not limited to such products. For example, a process having variable processing conditions (e.g., temperature and pressure) and variable ingredients (e.g., an acid from the group consisting of . . . ) as parameters may be identified using the present invention. Indeed, any subject matter, whether it is a product, process or otherwise, can be identified using the present invention so long as it is identifiable by options of multiple parameters, with each parameter having a determinable range of options.

The constructed identifier will preferably include a plurality of digits, ranging from a rightmost least significant digit, to a leftmost most significant digit. The terms least significant digit and most significant digit refer to numerical values of digits of a number, and not the importance of information represented by the digits. Thus, in the decimal number 109, the rightmost digit 9 has the lowest numerical value $9 \times 10^0$ and is the least significant digit, while the leftmost digit 1 has the greatest numerical value $1 \times 10^2$ and is the most significant digit.

Referring again to FIG. 2, a digit is next assigned to each parameter, ranging from the rightmost digit to the leftmost digit, as in step 220. The automobile parameters in FIG. 4, for example, are assigned digits one through ten. The order of assignment is not particularly important, though a logical progression of parameters is preferred. Thus, the example shown in FIG. 4 assigns the leftmost digit to a general parameter (i.e., the division or make of the car) and the rightmost digit to a very specific parameter (i.e., the type of windshield).

Next, options for each parameter are defined, as in step 230. The options should include all variable features useful for distinguishing one configuration of the product from another. A range of available options for a parameter may be a function of options for another parameter. In other words, options for one parameter may interrelate with options for one or more other parameters.

For example, if the product is a personal computer, one parameter may be the CPU while another parameter may be the make, for which options may include APPLE® and COMPAQ® personal computers. In the case of a COMPAQ® personal computer, available options for the CPU may be limited to a range of INTEL® and AMD® microprocessors. In the case of an APPLE® computer, available options for the CPU may be limited to a range of MOTOROLA® microprocessors. (The marks APPLE®, INTEL®, AMD® and MOTOROLA® are registered trademarks of Apple Computer Inc., Intel Corporation, Advanced Micro Devices Inc., and Motorola Inc., respectively)

Referring to FIG. 4, the options for each parameter for an automobile are defined. In the example shown, options for the model parameter are a function of the make parameter. Thus, the third set of options specified for the model parameter (i.e., CENTURY®, REGAL®, LE SABRE®, PARK AVENUE®. . . ) corresponds to the third option of the make parameter (i.e., BUICK®). (All marks used in FIG. 4 in the division and model parameters are registered trademarks of General Motors Corporation).

Referring again to FIG. 2, after defining options for each parameter, the greatest number of possible options is determined, as in step 240. If, for example, there are three parameters, the first parameter having 3 options, the second parameter having one set of 11 options and a second set of 10 options, and the third parameter having 6 options, the greatest number of possible options is 11. This number is used to determine a radix for the constructed number.

Next, a radix is chosen for the constructed number, as in step 250. The radix is the base of the applicable number system, such as 2 in the binary system, 8 in the octal system, 10 in the decimal system and 16 in the hexadecimal system. The radix equals or preferably exceeds the greatest number of possible options, as determined in step 240, described above. In the example discussed above, as the greatest number of possible options is 11, a radix of 10 will not suffice unless multiple digits are assigned to a parameter, which would be less efficient than using a single digit and would also be unnecessary. A radix of 11 will suffice, using numbers 0 through 9 and letter A. Of course, a radix of 16 will also suffice, with letters B, C, D, E and F then being unused, but available for later use. Assuming the greatest number of possible options for a parameter of a configuration of a product is 36, a radix of 36 can be used, based on numbers 0 through 9 and, for example, upper case letters A through Z. Having 36 or more options for a given parameter is unlikely for a manufacturing operation. Nevertheless, should the greatest number of possible options exceed 36, additional characters (e.g., lower case letters) may be used to represent options above the $36^{th}$, or two or more digits may be allocated to parameters as needed.

Next, numerical values may be assigned to each possible option using the selected number base, as in step 260. For parameters having multiple sets of options, numerical values are preferably restarted for each set. The order of assignment is not particularly important, though a logical progression of options is preferred. While numbers and letters are preferred symbols for identifying options, other symbols, such as characters that are not alpha-numeric, may be used and are within the scope of the present invention.

Referring again to FIG. 4, options for parameters of an automobile are numbered. In the example shown, options for the model parameter are a function of the make parameter. Thus, options in the third set specified for the model parameter (i.e., 1. CENTURY®, 2. REGAL®, 3. LE SABRE®, 4. PARK AVENUE®. . . ), which correspond to the third option of the make parameter (i.e., 3. BUICK®), are numbered consecutively, starting with 1.

Figure 3:
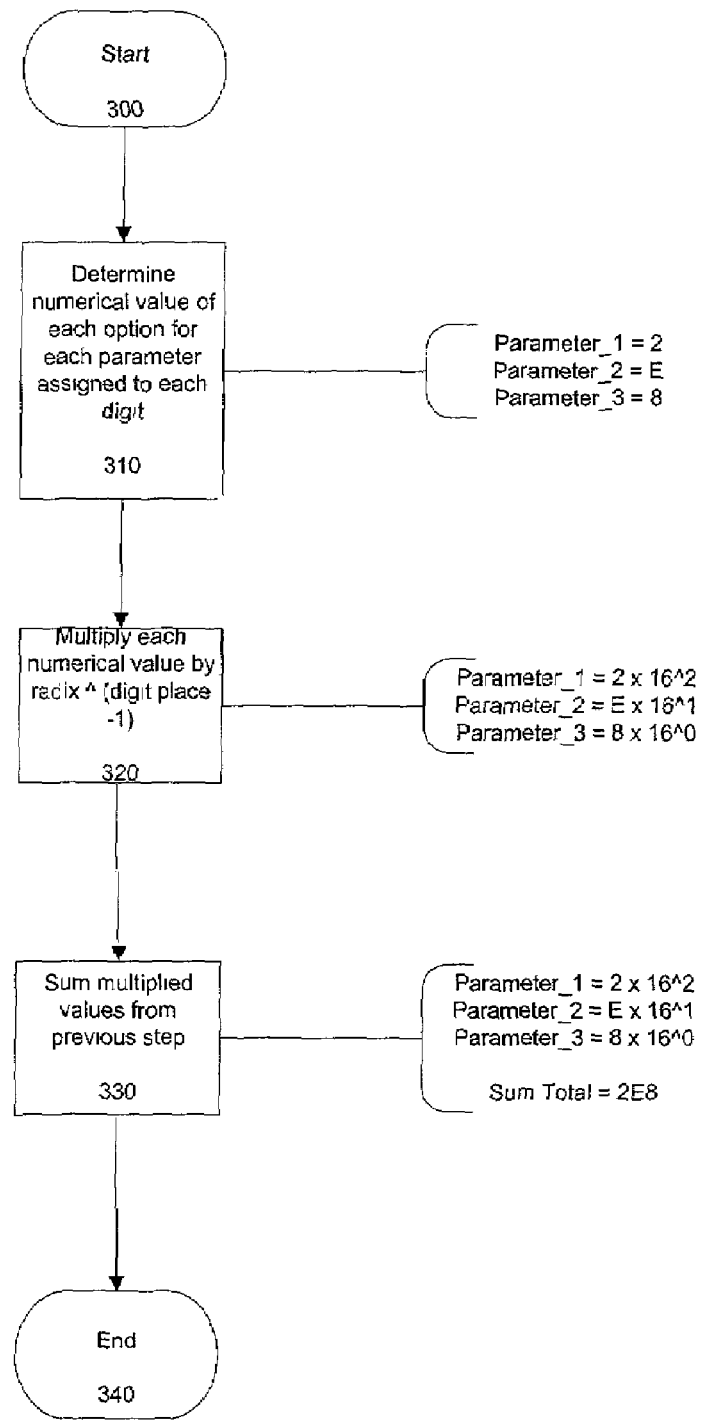
FIG. 3 depicts a flowchart illustrating an exemplary number construction process in accordance with the present invention.

After assigning numerical values to available options, as in step 260, numbers may be constructed representing product configurations. FIG. 3 provides a flowchart illustrating an exemplary number construction process in accordance with the present invention. First, a numerical value for each applicable option for each parameter assigned to each digit is determined, as in step 310. In a preferred implementation, the digit 0 represents the $10^{th}$ option (where there are ten or more options), rather than the first option. Thus, the digit 1 intuitively represents the first option, the digit 2 represents the $2^{nd}$ option, and so on.

For example, in a three digit hexadecimal number having three parameters, the second option of the first parameter may apply, yielding a numerical value of 2 for that digit; the fifteenth option of the second parameter may apply, yielding a numerical value of E for that digit; and the eighth option of the third parameter may apply, yielding a numerical value of 8 for that digit. It is understood that, if 0 represents the first option instead of the tenth option, the values would be 1, E and 7, a less intuitive result, though clearly within the scope of the present invention.

Next, each numerical value determined in step 310 is multiplied by the radix raised to the exponent applicable to the corresponding digit. The radix is determined in step 250 of the assignment process, as illustrated in FIG. 2. The exponent equals the digit place, counting from right to left, minus one. Thus, the exponent for the least significant (rightmost) digit is 0. As the exponent increases by 1 for each digit moving from right to left, it is 1 for the second digit from the right, 2 for the third digit from the right, and so on, up to exponent for the most significant leftmost digit.

Continuing with the three digit hexadecimal number example, the radix is 16 and the exponents for the first, second and third digits are 0, 1 and 2, respectively. Thus the hexadecimal values for parameters 1, 2 and 3 are 200, E0 and 8, respectively.

Next, the sum of the values calculated in step 320 is determined, resulting in a constructed number representing a configuration of the product. Continuing again with the three digit hexadecimal number example, the sum of 200+E0+8 equals 2E8.

Figure 5:
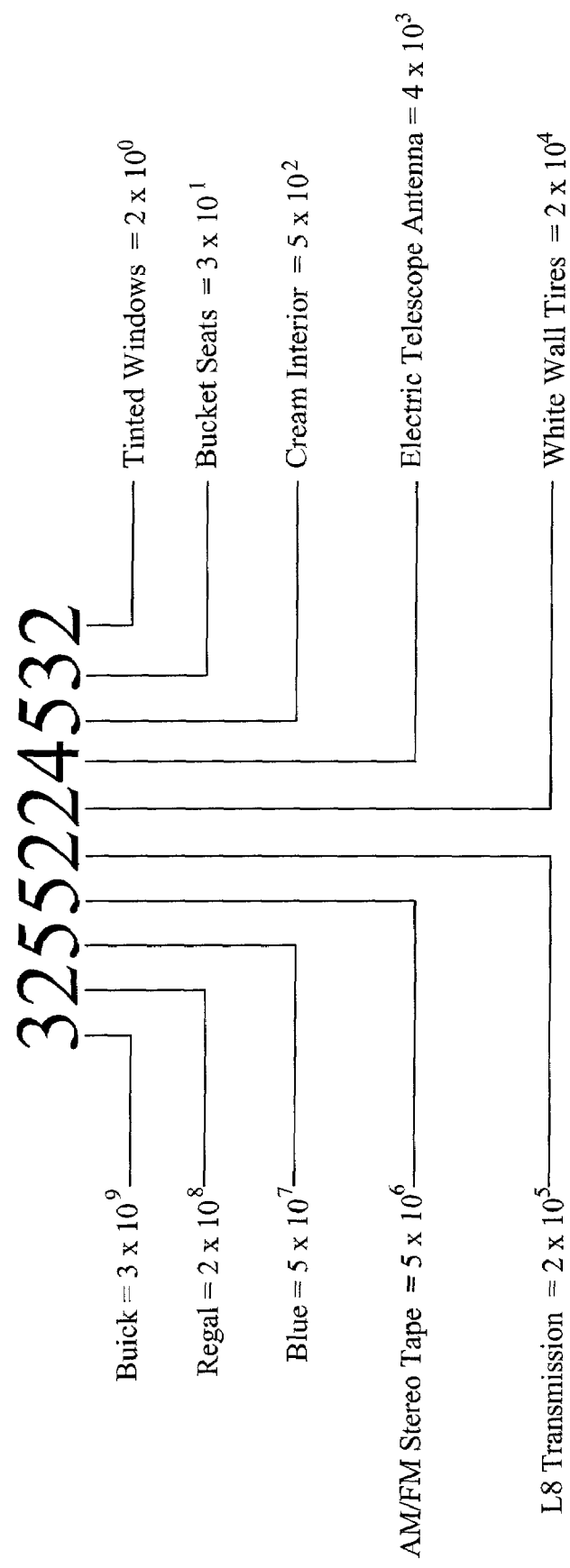
FIG. 5 depicts an identifier constructed, as an example, in accordance with a preferred implementation of the construction process of the subject invention.

A number representing an automobile configuration based on the ten parameters listed in FIG. 4 can similarly be constructed. Assuming the greatest number of options is less than ten, a radix of 10 will suffice. As there are ten parameters, the highest exponent will be 9. For example, FIG. 5 illustrates the elements of a number constructed to represent a blue BUICK® REGAL® with an AM/FM stereo and tape player, an L8 transmission, bucket seats, a cream interior, an electric telescope antenna and white wall tires, as follows: Division=BUICK®=$3 \times 10^9$; Model=REGAL®=$2 \times 10^8$; Paint=Blue=$5 \times 10^7$; Radio=AM/FM Stereo Tape=$5 \times 10^6$; Transmission=L8=$2 \times 10^5$; Tires=White Wall=$2 \times 10^4$; Antenna=Electric Telescope=$4 \times 10^3$; Interior Color=Cream=$5 \times 10^2$; Front Seats=Bucket=$3 \times 10^1$; and Windshield=Tinted=$2 \times 10^0$. The sum of the option values is 3255224532.

An n-parameter configuration may, therefore, be expressed according to the following equation:

$$\text{Identifier} = \sum_{i=1}^{n} \text{Option}_i \times R^{(i-1)}$$

Where:
Identifier is an n-digit number representative of a configuration in accordance with the present invention;
$\text{Option}_i$ is the value of the option for the $i^{th}$ parameter represented by the $i^{th}$ digit of the Identifier, moving from right to left with the $1^{st}$ digit being the rightmost digit and the $n^{th}$ digit being the leftmost digit; and
R is the chosen radix.

Configuration information in accordance with the present invention can easily be stored, along with associated data, for efficient searching and retrieval. Referring to FIG. 6, exemplary automobile configuration information, in accordance with the present invention, is stored in a table along with associated location and quantity information. The configuration information is comprised of a ten-digit number, with each digit representing an option for a parameter. Instead of requiring ten separate fields to define the ten-parameter configuration, a single field with a single number having one digit per parameter is used, resulting in considerable storage savings.

While location information, as shown in FIG. 6, occupies a separate field, that information may instead be included as an additional parameter of the configuration, assuming a determinable number of location options exist. The same holds true for other fields of information related to the configuration, such as a build date, which may, for example, be represented by a year parameter; month and year parameters; day, month and year parameters; a year parameter and an n-digit number representative of possible build dates during a year; or some other parameter(s) indicative of the date.

A table, as in FIG. 6, can be structured in several ways. One structure may include a row (or record) for each numerical value of an n-digit identifier (referred to herein as a "Type I Table"). For example, 1000 records, in increasing numerical order, may be provided to cover numerical values 000 through 999 of a three-digit decimal identifier. Finding information for configuration 123, for example, would entail locating the 124$^{th}$ record (or row) of the table, assuming the first row corresponds to 000. Fields for records that do not correspond to valid configurations may be blank or include an illegal configuration symbol or message. Thus, if any parameter has only five valid options (0 through 4), all configurations that include the number 5 or greater for the corresponding digit would be invalid or illegal.

As mentioned above, an exemplary system implementing the present invention may consider certain configurations illegal, possibly resulting in an error message or an illegal value in a field. A configuration may be considered illegal if it includes either an unavailable option or an option incompatible with options for other parameters of the identifier. For example, an automobile configuration that includes the ninth option for an engine parameter, while only six options are available, may be considered illegal. Even an automobile configuration that includes an option corresponding to an available eight cylinder engine may be considered illegal, if, for example, options for the make and model of the configuration correspond to a vehicle that does not accommodate an eight cylinder engine, such as a CHEVROLET® PRIZM® or CAVALIER®. (The marks CHEVROLET®, PRIZM® and CAVALIER® are registered trademarks of General Motors Corporation).

Another structure for a table, as in FIG. 6, may include rows (or records) only for valid (legal) configurations (referred to herein as a "Type II Table"). Thus, if each parameter of a three-digit decimal configuration identifier has only five valid options (0 through 4), then the table would include $5^3$=125 records. In such a case, finding information for configuration 123, for example, could be accomplished using searching techniques known in the art, such as binary tree and hashing techniques. To facilitate searching, the records may be arranged in numerical order by configuration number or sorted by configuration number using sorting techniques known in the art.

Type I and Type II Tables are described above and referenced herein for exemplary purposes. It is understood that other means for storing configurations with related information may be used and are clearly within the scope of the present invention.

In certain implementations of the present invention, different configuration numbers may be deemed equivalent for certain purposes. For example, configurations for personal computers may include a parameter for each available slot, options for which may include certain graphics cards, modems, network cards, scanner cards, etc. A configuration having a certain modem in the second slot and a certain network card in the third slot may be deemed equivalent to a configuration having the same modem and network card in any other slots. Similarly, a configuration having two graphics cards to support two monitors may be considered equivalent to another configuration that also has the same two graphics cards, but in different slots than the first configuration.

Such equivalency should preferably be taken into account in constructing identifiers and creating and searching a table or database for such configuration data. In the personal computer example, if it is important to identify the installed cards, but not important to identify in which slot each card is installed, the configuration may list the options corresponding to the installed cards in ascending order (from right to left, or vice versa) within the configuration number. Thus, a three digit configuration number, with each digit corresponding to a device installed in a slot, may be 321, if devices corresponding to the first, second and third options are installed in the slots (irrespective of the slot in which each device is installed). On the other hand, if each parameter corresponds to a specific slot, then configurations 123, 132, 231, 213, 312 and 321 could be considered equivalents for certain purposes, which may be taken into account in searching.

An important aspect of the subject invention is that it allows the addition of options without modifying existing data. Ninth and tenth options may be added to a parameter of a product configuration represented by a decimal number without affecting existing data or changing the radix. Additionally, eleventh through sixteenth options may be added to a parameter of a product configuration represented by a decimal number without affecting existing data. The radix may be increased to 16 or greater to accommodate the new options. Existing decimal data would not have to be converted to a hexadecimal equivalent. Rows corresponding to additional configurations may have to be added to either a Type I or Type II Table.

To illustrate, a three-digit decimal number 818 according to a preferred implementation of the present invention may represent a three-parameter configuration having the eighth option of a first parameter, the first option of a second parameter and the eighth option of a third parameter. Even if the radix is increased to 16 to accommodate up to 16 options per parameter, the original number 818 remains valid. That number still represents the eighth option of the first parameter, the first option of the second parameter and the eighth option of the third parameter. There is no need to convert the decimal number 818 to its hexadecimal numerical equivalent 332, and, in fact, the converted number would not accurately represent the intended configuration.

To accommodate these additional options, a table, database or file associating information with the configurations may have to be amended. In a Type I Table, for example, rows may be added for each new configuration number (whether legal or illegal). While 3-digit decimal configurations may occupy $10^3$=1,000 rows in a Type I Table, 3-digit hexadecimal configurations may occupy $16^3$=4,096 rows. Fields for records of illegal configurations may be marked as illegal. In contrast, only rows for new legal configurations would be added to a Type II Table.

Should the number of options for a parameter increase beyond the radix, then (in lieu of or in addition to increasing the radix) one or more digits may be added to accommodate the options for that parameter. For example, color options seventeen through eighty may be added to a parameter of a product configuration represented by a hexadecimal identifier, with the first (rightmost) digit corresponding to color, the second digit corresponding to size, and the third (leftmost) digit corresponding to location. Rather than increase the radix to accommodate the additional options, a digit may be added to the identifier. While the additional digit may be placed at any location in the identifier, placement as the most significant digit is preferred. Thus, two hexadecimal digits, i.e., the original digit assigned to the parameter and the added digit (which might not be adjacent to the original digit), may represent up to 256 options for the parameter. As the rightmost digit may still represent the original 16 (or less) colors, with the leftmost digit being zero, original values may retain their numerical value. Thus, a product configuration having the twelfth color option, second size option and third location option could be represented by the number 32B before the addition of the fourth digit, and numerically equivalent 032B after the addition of the fourth digit.

To accommodate the additional digit, a table, database or file associating information with the configurations may have to be amended. In a Type I Table, for example, rows may be added for additional configuration numbers (whether legal or illegal). While 3-digit hexadecimal configurations may occupy $16^3=4,096$ rows, 4-digit hexadecimal configurations may occupy $16^4=65,536$ rows. Original configuration numbers may be amended by adding a digit, preferably having a value of zero. Fields for records of illegal configurations may be marked as illegal.

In the case of a Type II Table, original configuration numbers would be amended by adding a digit, preferably having a value of zero, as with a Type I Table. However, only rows for additional legal configurations would be added to the Type II Table to accommodate the additional digit.

Another important aspect of the subject invention is that it allows the addition of parameters with relative ease. For example, a digit representing a fourth parameter may be added to an identifier for a three parameter configuration. If the radix equals or exceeds the number of options for the fourth parameter, then a single additional digit can represent the parameter. While the additional digit may be placed at any location in the identifier, placement as the most significant digit is preferred. Should the number of options for the added parameter exceed the radix, then multiple digits may be added and/or the radix may be increased to accommodate the options for the added parameter, as discussed above. To accommodate an additional parameter, a table, database or file associating information with the configurations may have to be amended as discussed above for accommodating an additional digit.

The foregoing detailed description of particular preferred implementations of the invention, which should be read in conjunction with the accompanying drawings, is not intended to limit the enumerated claims, but to serve as particular examples of the invention. Those skilled in the art should appreciate that they can readily use the concepts and specific implementations disclosed as bases for modifying or designing other methods and systems for carrying out the same purposes of the present invention. Those skilled in the art should also realize that such equivalent methods and systems do not depart from the spirit and scope of the invention as claimed.

Having thus described the present invention, what is claimed as new and desired to be secured by Letters Patent is as follows:

1. A computer-implemented method for identifying a configuration using an identifier having a sequence of digits, said configuration having a plurality of parameters and each of the parameters having a plurality of options, particular options for respective parameters differentiating respective configurations, said method including steps of:
   assigning respective digits to different parameters of the configuration,
   assigning a value to each option for each parameter of the configuration, and
   constructing the identifier based on the value of each option corresponding to the configuration, wherein said identifier is not changed when additional digits are required to accommodate subsequent additional parameters or options.

2. The method according to claim 1, said method further including steps of
   determining the greatest number of options for the parameters, and
   selecting a radix for the identifier, said radix being equal to or greater than the greatest number of options for a parameter of the configuration.

3. The method according to claim 2, said method further including a step of assigning an exponent to each digit of the identifier, the digits of the identifier ranging from a least significant rightmost digit having a digit place of one to a most significant leftmost digit, each digit to the left of the least significant rightmost digit having a digit place equal to one plus the digit place of the immediate adjacent right digit, and said exponent being equal to the digit place minus one.

4. The method according to claim 3, said method further including a step of
   calculating a parameter value for each parameter by multiplying the value of the option corresponding to the configuration for each parameter by the radix raised to the exponent for the digit of the identifier corresponding to the parameter for the option,
   wherein the step of constructing the identifier based on the value of each option corresponding to the configuration further includes calculating the sum of the parameter values.

5. The method according to claim 4 wherein values assigned to options for a parameter in excess of the tenth option are represented by symbols.

6. The method according to claim 5, wherein the options for a parameter include more than one set of options, the applicability of a set being determined by the value of an option for another parameter corresponding to the configuration.

7. The method according to claim 6, wherein the step of constructing the identifier based on the value of each option corresponding to the configuration further includes constructing the identifier based on the following equation:

$$\text{Identifier} = \sum_{i=1}^{n} \text{Option}_i \times R^{(i-1)}$$

Where:
n is the number of digits in the Identifier and the number of parameters in the configuration;

Option$_i$ is the value of the option for the i$^{th}$ parameter represented by the i$^{th}$ digit of the Identifier, moving from right to left with the 1$^{st}$ digit being the rightmost digit and the n$^{th}$ digit being the leftmost digit; and R is the radix for the Identifier.

8. A computer-implemented method of identifying a configuration using an identifier having a sequence of digits, said configuration having a plurality of parameters and each of the parameters having a plurality of options, particular options for respective parameters differentiating respective configurations, said method comprising steps of:

assigning respective digits of the identifier to different parameters of the configuration, assigning a value to each option for each parameter, and constructing the identifier by assigning the value of each option corresponding to the configuration to the digit of the identifier corresponding to the parameter for the option, wherein said identifier is not changed when additional digits are required to accommodate subsequent additional parameters or options.

9. The method according to claim 8 wherein each value assigned to an option for a parameter in excess of the tenth option is represented by a letter of the alphabet.

10. The method according to claim 9, wherein the options for a parameter include more than one set of options, the applicability of a set being determined by the value of an option for another parameter corresponding to the configuration.

11. The method according to claim 10, wherein the step of constructing the identifier by assigning the value of each option corresponding to the configuration to the digit of the identifier corresponding to the parameter for the option further includes constructing the identifier based on the following equation:

$$\text{Identifier} = \sum_{i=1}^{n} \text{Option}_i \times R^{(i-1)}$$

Where:

n is the number of digits in the Identifier and the number of parameters in the configuration;

Option$_1$ is the value of the option for the i$^{th}$ parameter represented by the i$^{th}$ digit of the Identifier, moving from right to left with the 1$^{st}$ digit being the rightmost digit and the n$^{th}$ digit being the leftmost digit; and R is the radix for the Identifier.

12. A computer-implemented method of identifying a configuration using an identifier having a sequence of digits, said configuration having a plurality of parameters and each of the parameters having a plurality of options, particular options for respective parameters differentiating respective configurations, said method comprising steps of:

for each parameter of the configuration, assigning at least one digit of the identifier exclusively to the parameter, assigning a value to each option for each parameter, and constructing the identifier by assigning the value of each option corresponding to the configuration to a digit of the identifier corresponding to the parameter for the option, wherein said identifier is not changed when additional digits are required to accommodate subsequent additional parameters or options.

13. A computer-implemented system for identifying a configuration using an identifier having a sequence of digits, said configuration having a plurality of parameters and each of the parameters having a plurality of options, one of said options for each parameter corresponding to the configuration, said system including:

means for assigning each digit of the identifier to a different parameter of the configuration, means for assigning a value to each option for each parameter, and means for constructing the identifier based on the value of each option corresponding to the configuration, wherein said identifier is not changed when additional digits are required to accommodate subsequent additional parameters or options.

14. The computer implemented system according to claim 13 said system further including means for determining the greatest number of options for the parameters, and means for selecting a radix for the identifier, said radix being equal to or greater than the greatest number of options for a parameter of the configuration.

15. The computer implemented system according to claim 14, said system further including means for assigning an exponent to each digit of the identifier, the digits of the identifier ranging from a least significant rightmost digit having a digit place of one to a most significant leftmost digit, each digit to the left of the least significant rightmost digit having a digit place equal to one plus the digit place of the immediate adjacent right digit, and said exponent being equal to the digit place minus one.

16. The computer implemented system according to claim 15, said system further including means for calculating a parameter value for each parameter by multiplying the value of the option corresponding to the configuration for each parameter by the radix raised to the exponent for the digit of the identifier corresponding to the parameter for the option, wherein the means for constructing the identifier based on the value of each option corresponding to the configuration further includes means for calculating the sum of the parameter values.

17. The computer implemented system according to claim 16 wherein values assigned to options for a parameter in excess of the tenth option are represented by symbols.

18. The computer implemented system according to claim 17, wherein the options for a parameter include more than one set of options, the applicability of a set being determined by the value of an option for another parameter corresponding to the configuration.

19. The computer implemented system according to claim 18, wherein the means for constructing the identifier based on the value of each option corresponding to the configuration further includes means for constructing the identifier based on the following equation:

$$\text{Identifier} = \sum_{i=1}^{n} \text{Option}_i \times R^{(i-1)}$$

Where:

n is the number of digits in the Identifier and the number of parameters in the configuration;

Option$_i$ is the value of the option for the i$^{th}$ parameter represented by the i$^{th}$ digit of the Identifier, moving from right to left with the 1$^{st}$ digit being the rightmost digit and the n$^{th}$ digit being the leftmost digit; and R is the radix for the Identifier.

20. A computer-implemented system for providing information concerning subject matter having multiparameter configurations, the system including records for desired multi parameter configurations, the multi parameter configurations having a plurality of parameters and each of the parameters having a plurality of options, one of the options for each parameter corresponding to a distinct multiparameter configuration, each of the records including:
- an identifier for the desired multiparameter configuration, said identifier including a digit for each parameter of the multiparameter configuration; and
- information concerning the subject matter having the multiparameter configuration identified by the identifier;

said system including:
- means for assigning each digit of the identifier to a different parameter of the configuration;
- means for assigning a value to each option for each parameter, and
- means for constructing the identifier based on the value of each option corresponding to the configuration, wherein said identifier is not changed when additional digits are required to accommodate subsequent additional parameters or options.

21. A computer implemented system for providing information concerning subject matter having multiparameter configurations as in claim 20, wherein said information concerning the subject matter having the multiparameter configuration identified by the identifier includes an illegal configuration reference if the multiparameter configuration is not valid for the subject matter.

\* \* \* \* \*